(12) United States Patent
Koga

(10) Patent No.: US 6,462,773 B1
(45) Date of Patent: Oct. 8, 2002

(54) VIDEO MONITORING SYSTEM

(75) Inventor: Takahiro Koga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/120,191

(22) Filed: Jul. 22, 1998

(30) Foreign Application Priority Data

Jul. 24, 1997 (JP) ............................................ 9-198336

(51) Int. Cl.⁷ ................................................ H04N 7/18
(52) U.S. Cl. ..................................................... 348/143
(58) Field of Search ................................ 348/141, 143, 348/144–150, 155, 153, 154, 157–170, 146; 382/296; H04N 7/18

(56) References Cited

U.S. PATENT DOCUMENTS

| | | | |
|---|---|---|---|
| 5,243,418 A | * 9/1993 | Kuno et al. ................. | 358/108 |
| 5,339,104 A | * 8/1994 | Hong .......................... | 348/155 |
| 5,412,487 A | * 5/1995 | Nishimura et al. .......... | 358/452 |
| 5,506,624 A | * 4/1996 | Moreton ..................... | 348/420 |
| 5,619,597 A | * 4/1997 | Moreton ..................... | 382/296 |
| 5,631,697 A | * 5/1997 | Nishimura et al. .......... | 348/172 |
| 5,668,914 A | * 9/1997 | Inuiya et al. ................. | 386/46 |
| 5,926,209 A | * 7/1999 | Glatt .......................... | 348/143 |
| 5,963,254 A | * 10/1999 | Kim et al. ................... | 348/363 |
| 6,088,468 A | * 7/2000 | Ito et al. ..................... | 382/103 |
| 6,191,814 B1 | * 2/2001 | Elberbaum .................. | 348/212 |
| 6,239,833 B1 | * 5/2001 | Ozaki et al. ................. | 348/159 |

FOREIGN PATENT DOCUMENTS

| | | |
|---|---|---|
| JP | 59-119989 | 7/1984 |
| JP | 4-257190 | 9/1992 |
| JP | 5-151471 | 6/1993 |

* cited by examiner

*Primary Examiner*—Chris Kelley
*Assistant Examiner*—Tung Vo
(74) *Attorney, Agent, or Firm*—Whitham, Curtis & Christofferson, P.C.

(57) ABSTRACT

An optical subscriber unit comprises a portion for detecting whether or not an installation distance of the optical subscriber unit is a short distance or a long distance when the optical subscriber unit receives a subscriber command from a center unit by referring to a received optical power, and a portion for transmitting response burst signal to an entrance use slot of the current frame when the installation distance is the short distance and to an entrance use slot of the next frame when the installation distance is the long distance. The center unit comprises a response burst signal detecting portion for detecting whether or not the response burst signal of the optical subscriber unit against the subscriber command in the current entrance use slot is present in the current entrance use slot, and an installation distance detecting portion for measuring a delay time period of the response burst signal of the optical subscriber unit against the subscriber command in the current entrance use slot so as to obtain the installation distance of the subscriber unit.

4 Claims, 4 Drawing Sheets

VIDEO MONITORING SYSTEM

BACKGROUND OF THE INVENTION

The present invention relates to a video monitoring system and, more particularly, to a video monitoring system of the type detecting the movement of a subject out of a video signal and outputting data representative of the movement.

A video monitoring system of the type described is taught in, e.g., Japanese Patent Laid-Open Publication No. 4-260979. The conventional video monitoring system is used to track moving objects appearing on a screen by executing processing within a preselected period of time without regard to the number of the objects, or to track a particular moving object without being effected by the collision of the object with another moving object or the disappearance of the object due to another object. With this system, it is possible to monitor, e.g., a suspicious person.

The conventional video monitoring system, however, needs a large capacity memory and several LSIs (Large Scale Integrated circuits) and relies on the learning effect of neural networks. Therefore, the system, including an image pick-up device, is extremely expensive. Moreover, the system needs a broad space for installation.

Technologies relating to the present invention are also disclosed in, e.g., Japanese Patent Laid-Open Publication Nos. 63-296132, 6-6659, and 8-249050.

SUMMARY OF THE INVENTION

It is therefore an object of the present invention to provide a video monitoring system which, including an image pick-up device, is low cost.

It is another object of the present invention to provide a space saving video monitoring system.

A video monitoring system of the present invention includes an image pick-up device for shooting a subject and outputting a video signal representative of the subject. A processing unit divides the video signal input thereto into a number of blocks frame by frame, calculates mean values of luminance data or color data block by block, calculates differences between the mean values of the blocks of the current frame and the mean values of the corresponding blocks of a frame occurred several frames before, compares values derived from the differences and a mean value of the differences with a preselected value to thereby determine whether or not a movement has occurred, and outputs movement detection data when a movement occurs. A display unit displays the image of the subject and movement detection data. With this configuration, the system is capable of detecting the movement of an image without resorting to any neutral network.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
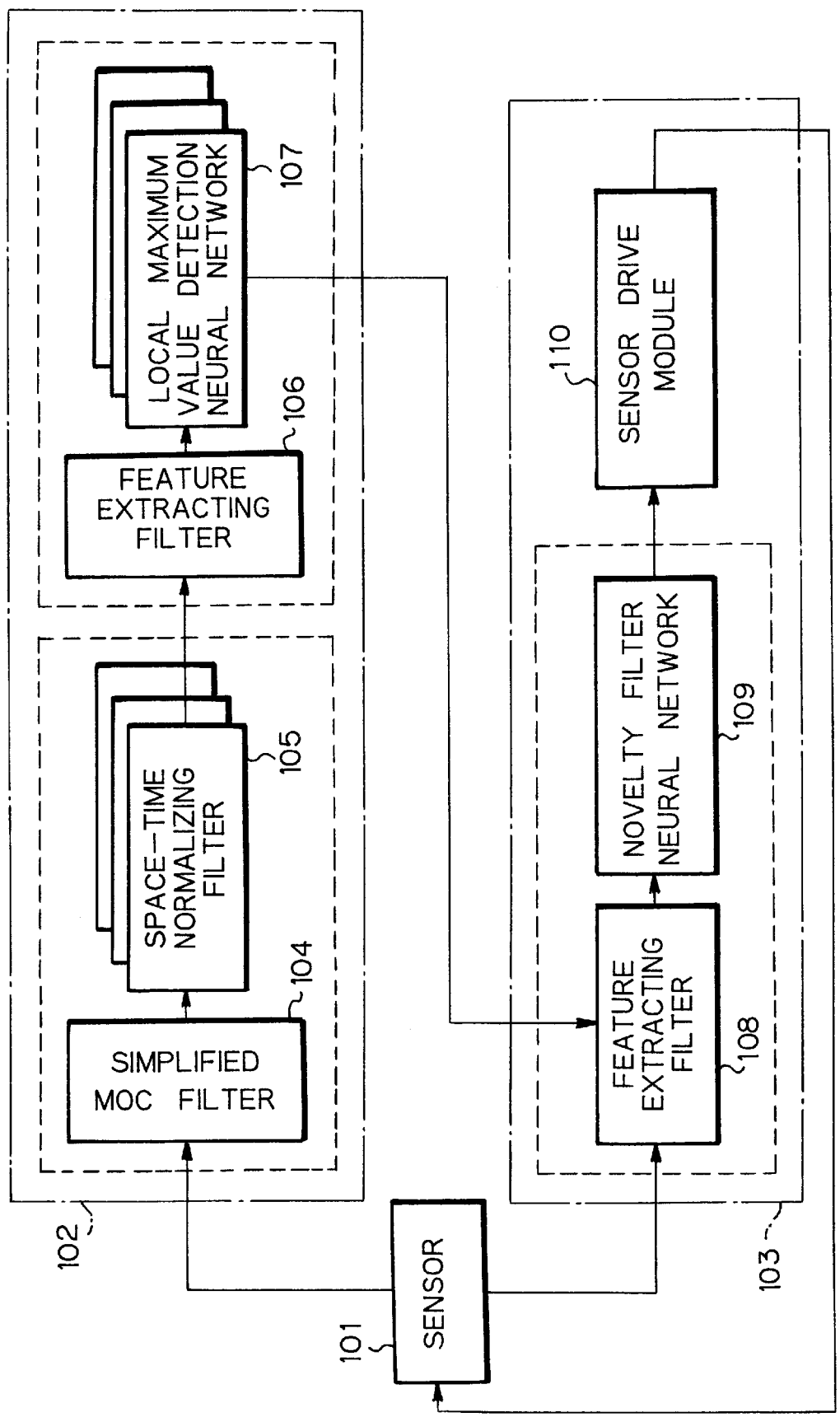
FIG. 1 is a block diagram schematically showing a conventional video monitoring system.

To better understand the present invention, brief reference will be made to a conventional video monitoring system taught in Japanese Patent Laid-Open Publication No. 4-260979 mentioned earlier. As shown in FIG. 1, the conventional apparatus is generally made up of a sensor 101 for outputting a bit map image, a movement detecting subsystem 102, and a movement tracking subsystem 103. The bit map image output from the sensor 101 is input to the two subsystems 102 and 103.

The movement detecting subsystem 102 includes a simplified MOC (Molion Oriented Contrast) filter 104 to which consecutive image frames output from the sensor 101 are input. The MOC filter 104 calculate, based on the luminance information (bit map image) of the individual pixels of the image frames, movement information (optical flow) relating to the contours of moving objects. A space-time normalizing filter 105 spatiotemporally averages and normalizes movement information relating to boundaries between the moving objects and fixed by the above optical flow, thereby causing the movement information to gather at the centers of the moving objects. A feature extracting filter 106 transforms the information output from the space-time normalizing filter 105 to monodimensional velocity information on the basis of a projection distribution. The velocity information are input to a local maximum value detection neutral network 107 having three layers.

The movement tracking subsystem 103 tracks desired one of the moving objects and includes a feature extraction filter 108. The feature extraction filter 108 defines a box (window) containing the desired object on the basis of the center information and contour information relating to the object. The filter 108 extracts shape information relating to the above object within the box and feeds them to a novelty filter neural network 109 having a single layer. In response, the neural network 109 determines the shape of the particular object.

Specifically, in the movement detecting subsystem 102, the MOC filter 104 and space-time normalizing filter 105 execute video information processing with the bit map image input from the sensor 101 in order to extract movement information. Subsequently, the feature extracting filter 106 extracts monodimensional movement information features. The local maximum value detection neural network 107 detects the center information of the moving objects and feeds them to the feature extraction filter 108 of the movement tracking subsystem 103. The filter 108 cuts out a box region containing desired one of the moving objects and extracts shape information relating to the object from the image lying in the box region. Subsequently, the novelty filter neural network 109 recognizes the moving object to track. In response to the output of the network 109, a sensor drive module 110 drives the sensor 101 such that the desired object is positioned at the center of the view field.

More specifically, when consecutive frames are fed from the sensor 101 to the MOC filter 104, the filter 104 calculates movement information (optical flow) relating to moving objects with two consecutive frames. The filter 104 is an optical flow calculating filter having three consecutive stages of processing, i.e., direction-by-direction edge detection using a space filter, luminance difference detection using a time space, and product sum combination association with the space filter and time filter. By comparing a current input image and the immediately preceding image with respect to luminance, the filter 104 calculates contour velocity information, i.e., an optical flow.

The space-time normalizing filter 105 is applied to the above optical flow direction by direction with the result that the optical flow is averaged and normalized with respect to space and time, i.e., velocity information relating to the moving objects are normalized on a direction basis. The normalized velocity information are input to the feature extracting filter 106. The filter 106 extracts direction-by-direction velocity information out of the information received from the filter 105.

The feature extraction filter 106 determines the monodimensional projection distribution of the velocity information in the direction of movement and the direction perpendicular thereto. The projection distribution is fed to the local maximum value detection neural network 107. The network 107 is implemented as a three-layer competitive neutral network. The network 107 learns the movement distributions of the individual moving objects to be tracked, and feeds the resulting information to the local maximum value detection neural network 107.

In the movement tracking subsystem 103, the feature extracting filter 107 extracts, out of the image information received from the sensor 101, features relating to the shape of the object within the picture cut out on the basis of the center information of the object. The novelty filter neural network 109 is educated to recognize the shapes of objects. Even when the desired moving object collides with another object or disappears due to another moving object or a stationary object, the network 109 is capable of outputting the shape of the desired moving object by association. This allows the system to continuously track the desired object without fail.

For the description of the shape and contour, use is made of edge detection, Fourier transform, generalized Huff transform or similar technology. The sensor drive module 110 is driven by the output of the network 109 such that the desired moving object is positioned at the center of the view field.

The conventional system having the above construction has some problems left unsolved, as discussed earlier.

Figure 2:
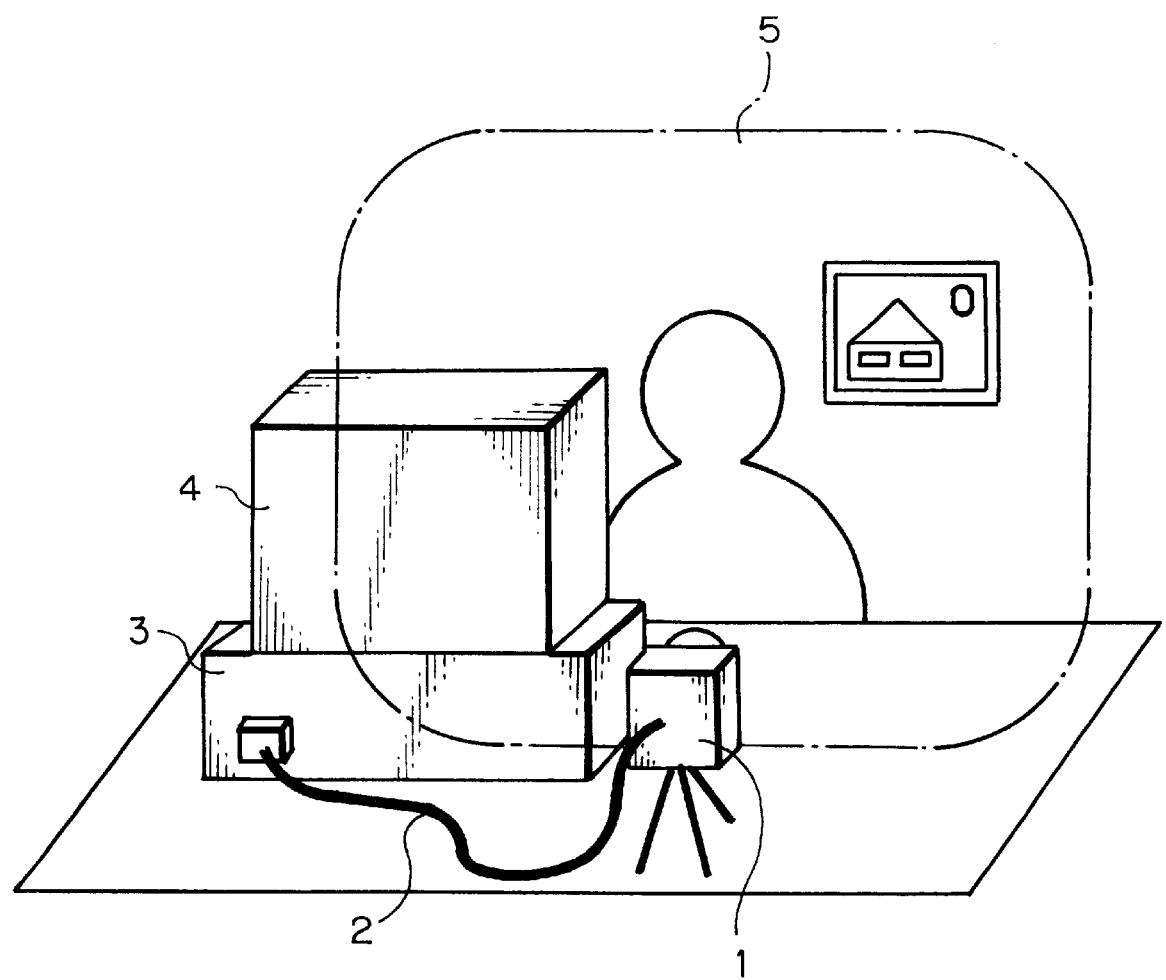
FIG. 2 is an external view of a video monitoring system embodying the present invention.

Referring to FIG. 2, a video monitoring system embodying the present invention will be described. As shown, the system includes a CCD (Charge Coupled Device) camera 1 which is a specific form of imaging means. The CCD camera 1 picks up a scene lying in an imaging area 5 and transform it to a corresponding electric video signal. The video signal is sent to a processing unit 3 and a display unit 4. The processing unit 3 continuously takes in the video being picked up by the camera 1 and executes image processing and various decisions for detecting movements. The display unit 4 displays the image being picked up by the camera 1 and displays, when a moving object is detected by the processing unit 3, the detection of a movement in response to the output of the processing unit 3.

Figure 3:
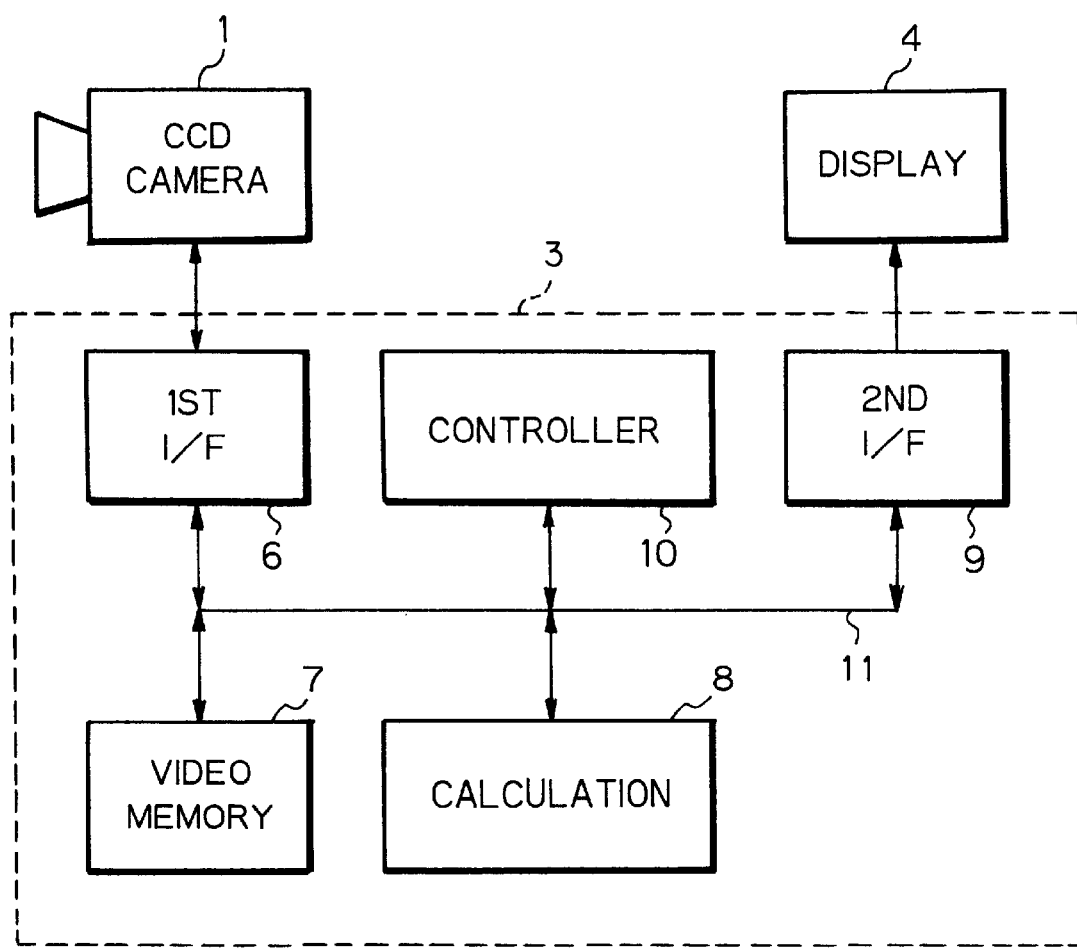
FIG. 3 is a block diagram schematically showing the illustrative embodiment.

The above video monitoring system is shown in a schematic block diagram in FIG. 3. As shown, the processing unit 3 includes a first interface (I/F) 6 and a second I/F 9. A digital video signal input from the CCD camera 1 via the first I/F 6 is written to a video memory 7. A calculation 8 divides the input video signal into a number of blocks frame by frame and then calculates the mean value of luminance data or color data block by block. The second I/F 9 is connected to the display unit 4. A controller 10 detects a movement on the basis of the mean values of luminance data of the current frame and those of a frame appeared several frames before the current frame, and outputs movement detection data. The sections 6–10 of the processing unit 3 are interconnected by a bus 11.

In operation, the calculation 8 reads out of the video memory 7 the digital video signal output from the camera 1 and written to the video memory 7 via the first I/F 6. The calculation 8 divides the video signal into blocks frame by frame, calculates a mean value of luminance data or color data block by block, and delivers the resulting block-by-block mean values to the controller 10. The controller 10 compares the mean values of the current frame and those of a frame occurred several frames before the current frame. If a difference between the current frame and the previous frame is greater than a preselected value, then the controller 10 determines that a movement has occurred, and outputs movement detection data. The movement detection data are superposed on the video data read out of the video memory 7 and then sent to the display unit 4 via the bus 11 and second I/F 9. As a result, the detection of a movement is displayed on the display unit 4 together with the image picked up by the camera 1.

Figure 4:
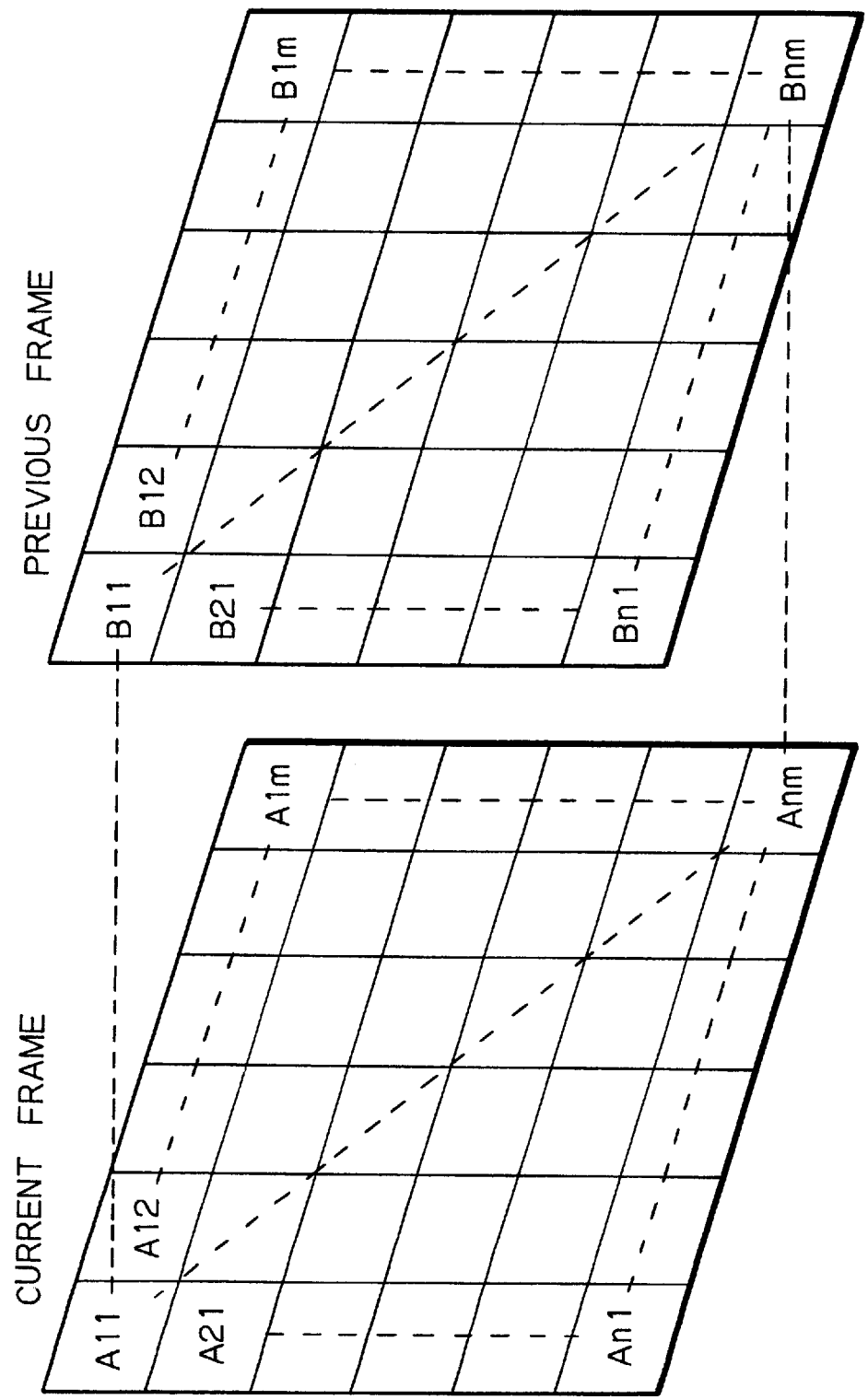
FIG. 4 shows how a processing unit included in the illustrative embodiment generates movement detection data.

How the processing unit 3 generates the movement detection data will be described more specifically with reference also made to FIG. 4. One frame of digital video signal input from the camera 1 via the I/F 6 is written to the video memory 7 at a time. As shown in FIG. 4, the calculation 8 divides the one frame of video signal into k blocks implemented as an n×m matrix (k=n×m) and gives serial numbers to the consecutive blocks.

Assume that the blocks of the current frame respectively have mean values of chrominance data (or color data) All–Amm (k in total), and that a frame occurred several frames before the current frame respectively have mean values of chrominance data (or color data) Bll–Bnm, as shown in FIG. 4. Then, the calculation 8 produces differences Dpq (p=1 to n and q=1 to m) between the mean values of the above two frames block by block. The block-by-block differences Dpq are therefore expressed as |Apq–Bpq| (p=1 to n and q=1 to m).

Subsequently, the calculation 8 calculates a mean value X of the block-by-block differences Dpq by using an equation:

$$X=(D11+D12+\ldots +Dnm)/k$$

Then, the calculation 8 produces differences Epq between the mean value X and the block-by-block differences Dpq:

$$Epq=|Dpq-X|\ (p=1\ \text{to}\ n\ \text{and}\ q=1\ \text{to}\ m)$$

The controller 10 determines, block by block, whether or not the difference Epq is greater than a preselected value. If the difference Epq is greater than the preselected value, then the controller 10 determines that a movement has occurred in the block on the pth row and qth column corresponding to the difference Epq. Then, the controller 10 generates movement detection data and sends it to the display unit 4 via the I/F 9.

It is to be noted that the processing unit 3 is small in size and can therefore be built in, e.g., the CCD camera 1, if desired.

In summary, it will be seen that the present invention provides a video monitoring system far simpler and far lower in cost than the conventional system relying on neural networks. The system of the invention, including an image pick-up device, needs a minimum of cost and a minimum of space for installation.

Various modifications will become possible for those skilled in the art after receiving the teachings of the present disclosure without departing from the scope thereof.

What is claimed is:

1. A video monitoring system comprising:

imaging means for shooting a subject and outputting a video signal representative of the subject;

a processing unit for:
  (a) dividing the video signal output from said imaging means into a number of blocks frame by frame,
  (b) calculating mean values of luminance data or color data block by block,
  (c) calculating differences between the mean values of the blocks of a current frame and the mean values of the corresponding blocks of a frame that occurred several frames before the current frame,
  (d) comparing values derived from said differences and a mean value of said differences with a preselected value to thereby determine whether or not a movement has occurred, and
  (e) outputting movement detection data when a movement occurs; and a display unit for displaying an image of the subject and said movement detection data respectively output from said shooting means and said processing unit.

2. A system as claimed in claim 1, wherein said processing unit is built in said shooting means.

3. A system as claimed in claim 1, wherein said processing unit comprises:

inputting means for receiving the video signal output from said shooting means;

storing means for storing the video signal input via said inputting means;

a calculating section for dividing the video signal read out of said storing means, one frame at a time, into the blocks, calculating the mean values of luminance data or color data of said video signal block by block, calculating the differences between the mean values of the blocks of the current frame and the mean values of the corresponding blocks of the frame occurred several frames before, and calculating absolute values of differences between the individual differences and a mean value of said individual differences block by block;

a controller for comparing said absolute values with the preselected value to thereby detect a block where a movement has occurred, and generating said movement detection data; and outputting means for sending said movement detection data output from said controller to said display unit.

4. A system as claimed in claim 3, wherein said processing unit is built in said shooting means.

* * * * *